Feb. 24, 1970   L. J. KELLER   3,497,271
TRACK PAD
Filed May 18, 1967

INVENTOR.
LOUIS J. KELLER
BY
ATTORNEY

United States Patent Office 3,497,271
Patented Feb. 24, 1970

3,497,271
TRACK PAD
Louis J. Keller, Gwinner, N. Dak. 58040
Filed May 18, 1967, Ser. No. 639,473
Int. Cl. B62d 55/26
U.S. Cl. 305—13                                    8 Claims

ABSTRACT OF THE DISCLOSURE

An articulated traction device which, as part of an endless track trained about a pair of tandem tired wheels, is retained on the tires by cooperative gripping action between the device and tires and which has one or more ground engaging cross bars, the inner tire opposing surfaces of which are convexly shaped for shedding material which accumulates between the bars and tires.

---

This invention relates to an endless track belt for tractors and other self-propelled vehicles, and is particularly applicable to wheeled vehicles of this type which are normally equipped with forwardly and rearwardly disposed (tandem) rubber tired wheels upon which the endless track of this invention can be mounted without removal of said wheels whereby said vehicle can be quickly and relatively easily converted from a wheel supported to a track supported, endless track type vehicle.

One of the important aspects of this invention is the novel design of the individual track pads or shoes, which cooperate with the tire structure of the wheels to maintain the track on the wheels for propulsion thereby.

Another important aspect of the invention is that the track pads are designed to be self-cleaning, thereby overcoming a serious problem normally associated with conventional tracks. When operated in dirt, mud and snow, conventional tracks, which normally are not self-cleaning, get filled and clogged with dirt, etc., which interferes with the traction capabilities thereof, and oftentimes builds up between the track and wheels to an extent as to cause slippage therebetween, and to frequently cause the track to break.

Still another important aspect of the invention is that the individual pads can be quickly removed from and installed on the track, for convenient repair and replacement.

Reference will now be had to the accompanying drawings for a more detailed description and better understanding of the invention, in which drawings like characters denote like or corresponding parts throughout the several views, and in which.

Figure 4:
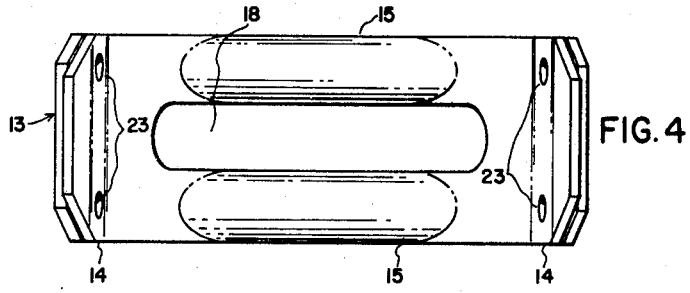
FIGURE 4 is a top plan view thereof.
Figure 3:
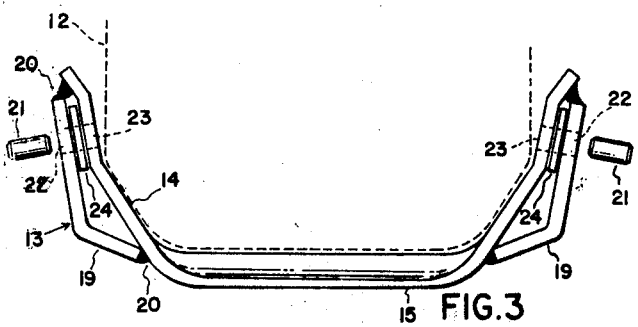
FIGURE 3 is a front elevational view of one of said track pads.
Figure 2:
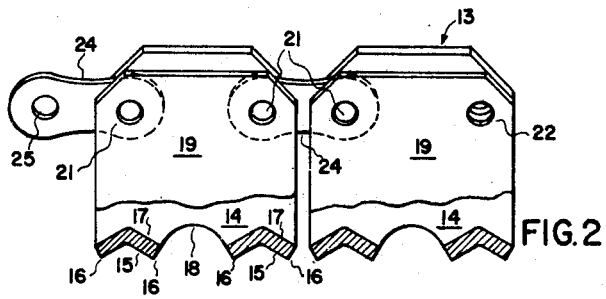
FIGURE 2 is a side elevational view of two of the track pads of FIGURE 1 (on an enlarged scale), with portions thereof broken away.
Figure 1:
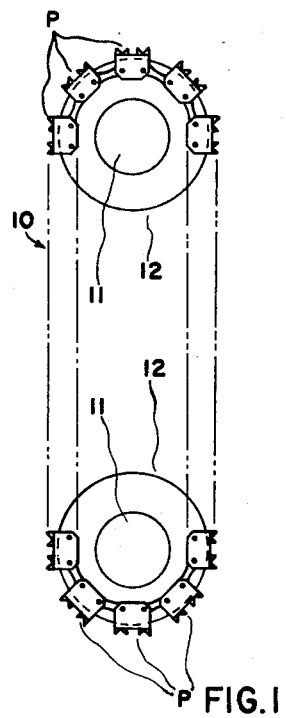
FIGURE 1 is a side elevational view of an endless track of this invention mounted upon a pair of rubber tired wheels, which wheels could be mounted on any type of vehicle, the illustration of the vehicle other than the wheels being considered unnecessary to a full understanding of the invention. In this view, a portion of the track is shown in broken line for convenience of illustration.

Referring to the drawings in detail, the endless track, referred to in its entirety by the numeral 10, is shown trained about a pair of wheels 11 provided with rubber tires 12 in the usual fashion.

The individual track pads shown in FIGURES 1 through 4 are referred to in their entirety by the numeral 13, and have a pair of opposed, generally downwardly and inwardly inclined, downwardly converging side walls 14 which are shaped to the general contour of the tire sidewalls and are adapted to have a wedging gripping action on the tires.

The side walls are integrally connected by a pair of identical parallel laterally spaced apart crossbars 15 which are adapted to engage and tractively grip the ground beneath the tire. These crossbars 15 are disposed transversely of the direction of travel and are of generally inverted V-shaped cross-section as clearly shown in FIGURE 2.

The concave underside of each bar includes a pair of transversely oriented downwardly pointing ridges or cleats or ribs 16 which in the form shown are quite sharp to provide maximum ground penetrating action.

The upper or inner surface 17 of each bar is convexly curved so that each side slopes downwardly at an angle of about 30° from the horizontal, with the inner longitudinal marginal edges of the bars defining and outlining the opening 18 between the bars of each pad.

Brackets 19 are mounted outwardly of the side walls 14 in spaced relationship therewith, except at the upper and lower end portions thereof, where they are secured as by welding 20 to the side walls.

These brackets serve to strengthen and reinforce the side walls, and also combine with the side walls to support pivot pins 21, which are installed (as by press fit) in aligned pairs of openings 22 and 23 formed in the brackets 19 and side walls 14 respectively.

The adjacent individual pads are pivotally interconnected by link members 24 which are disposed on both sides of the pads. Each link is an elongate member having an opening 25 formed at each end thereof for pivotally receiving a pivot pin 21 whereby said link is journalled on said pin for rotation relative thereto. The links are installed by inserting them between the side wall and bracket of a pad, aligning the opening 25 with a pair of aligned openings 22 and 23, and then inserting a pivot pin 21. Thus, the pads are free to articulate relative to each other as they pass around the tire periphery.

The pads have a cooperative wedging or gripping action with the tires, which retains them thereon and enables them to be propelled thereby.

The tire tread works against the upwardly or inwardly convexly curved upper face 17 of each cross bar or cleat. The longitudinal marginal edges of these crossbars and their respective upper surfaces communicate with the space between adjacent pads and the opening 18, so that any material leaving the upper face of the crossbar is free to drop back onto the ground. Thus, there are no horizontal flat surfaces or pockets facing the tire where material such as dirt or mud can build up between the pad and the tire. The entire upper surface of each cleat or crossbar is downwardly inclined relative to the horizontal so that material which settles thereon must necessarily be pushed therefrom back onto the ground by the action of the tire tread pressing downwardly thereagainst.

Figure 5:
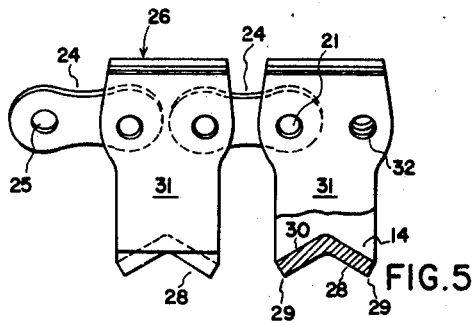
FIGURE 5 is a side elevational view of a pair of track pads constituting an alternate form of this invention.
Figure 6:
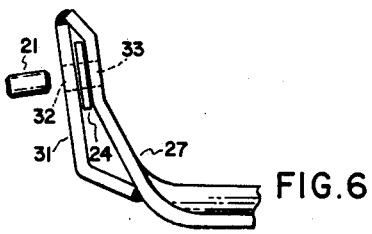
FIGURE 6 is a partial front elevational view of one of the track pads of FIGURE 5.

The modified or alternate form of track pad 26 shown in FIGURES 5 and 6 is similar to the form previously described, except that each pad has a single crossbar or cleat, instead of the double crossbars of the form first described.

Thus, the alternate form of pad 26 has a pair of upstanding downwardly converging side walls 27 connected by a transverse crossbar or cleat 28. The cleat has a concave lower surface terminating in a pair of downwardly pointing transverse ridges 29, and a convexly curved material shedding upper or inner surface 30. Side brackets 31 are welded to and outwardly of the side walls, and aligned pairs of holes 32 and 33 are formed in the brackets and side walls respectively for receiving pivot pins 21, which in turn pivotally support the links 24 which interconnect adjacent pads 26 in the manner previously described.

The pads 26 are self-cleaning for the same reasons previously expressed for pads 13. The upper or inner faces of the cleats are completely downwardly inclined, to shed dirt and other material under the influence of the tire tread pressing downwardly thereagainst, and there are no horizontal flat surfaces or upwardly facing pockets where dirt can collect or build up, the upper surfaces 30 each having longitudinal marginal edges which communicate with the space between the crossbars of adjacent pads, so as to shed material to said spaces and thus back to the ground.

The self-cleaning action in each form of invention is further enhanced by the articulation of each pad and the relative movement between adjacent pads.

Thus, the pads are self-cleaning because there is no place for material to collect and build up between the crossbar and the tires. The pads are firmly held on the tires by the wedging gripping action of the pad side walls on the tires, thereby requiring no additional mechanism for accomplishing same. The pads can be quickly removed by simply knocking out the pivot pins, and quickly installed by simply re-inserting said pivot pins to a press friction fit.

It is understood that changes may be made in the construction and in the combination and arrangement of the several parts disclosed herein within the scope of this invention.

What is claimed is:

1. A track pad of rigid construction for use with vehicles having tired wheels comprising:
   a transverse bar extending substantially the full width of the tire with which it is to be used,
   substantially all of the surface portion of said bar which faces said tire being downwardly inclined with respect to the horizontal when said pad is in ground engaging position,
   said surface portion terminating in lowermost marginal edge portion means,
   said lowermost marginal edge portion means terminating in a free edge from which material can leave said pad, and
   side walls extending upwardly from opposite ends of said bar and adapted to engage the side wall portions of said tire,
   said side walls of said pad being in downwardly converging relationship and having a cooperative wedging relationship with the tire with which the pad is used,
   a bracket of rigid construction secured to each side wall of said pad and disposed outwardly thereof in opposed relationship thereto,
   each side wall of said pad and its respective bracket having aligned openings formed therein,
   pivot pin means installed in said openings, and
   link means disposed between said brackets and their respective pad side walls and attached to said pivot means for connecting said track pad with another track pad in articulated relationship therewith.

2. The track pad of claim 1, wherein said surface portion of said bar which faces said tire is convexly shaped when viewed in cross-section.

3. The track pad of claim 1, wherein the portion of said bar facing away from said tire includes a pair of transverse parallel ground engaging ribs.

4. The track pad of claim 1, wherein said bar is generally inverted V-shaped design when viewed in cross section.

5. The track pad of claim 1, wherein said surface portion of said bar which faces said tire is convexly shaped when viewed in cross-section and wherein the portion of said bar facing away from said tire includes a pair of transverse parallel ground engaging ribs.

6. The track pad of claim 1, wherein said pivot pin means is press fitted into said openings and said link means is journalled on said pivot means for free rotation relative thereto.

7. The track pad of claim 1, wherein said track pad includes a pair of said bars disposed in parallel laterally spaced apart relationship and joined together by said side wall structure of said pad which is common to both bars.

8. The track pad of claim 7, wherein both of said bars are of generally inverted V-shaped cross-sectional design.

References Cited

UNITED STATES PATENTS

| | | | |
|---|---|---|---|
| 1,364,467 | 1/1921 | Wasson | 152—228 X |
| 1,808,416 | 6/1931 | Kennedy | 305—56 X |
| 3,355,224 | 11/1967 | Skanes | 305—57 |

FOREIGN PATENTS

| | | |
|---|---|---|
| 653,019 | 11/1962 | Canada. |
| 820,171 | 7/1937 | France. |
| 320,740 | 10/1929 | Great Britain. |
| 367,249 | 2/1932 | Great Britain. |
| 679,266 | 9/1952 | Great Britain. |

RICHARD J. JOHNSON, Primary Examiner

U.S. Cl. X.R.

305—56